(12) United States Patent
Peyras et al.

(10) Patent No.: US 7,911,165 B2
(45) Date of Patent: Mar. 22, 2011

(54) DEVICE FOR CONTROLLING AN ELECTROMECHANICAL ACTUATOR

(75) Inventors: Laurent Peyras, Toulouse (FR); David Rousset, Toulouse (FR)

(73) Assignee: Airbus France, Toulouse (FR)

( * ) Notice: Subject to any disclaimer, the term of this patent is extended or adjusted under 35 U.S.C. 154(b) by 529 days.

(21) Appl. No.: 12/017,578

(22) Filed: Jan. 22, 2008

(65) Prior Publication Data
US 2009/0021196 A1    Jan. 22, 2009

(30) Foreign Application Priority Data
Jan. 24, 2007 (FR) ..................................... 07 52865

(51) Int. Cl.
*H02P 21/00* (2006.01)
(52) U.S. Cl. ..................... 318/400.02; 318/798; 318/802
(58) Field of Classification Search .................. 318/432, 318/434, 599, 801–812, 798, 400.02
See application file for complete search history.

(56) References Cited

U.S. PATENT DOCUMENTS

| 6,288,515 | B1 | 9/2001 | Hiti et al. | |
|---|---|---|---|---|
| 6,396,229 | B1 | 5/2002 | Sakamoto et al. | |
| 6,950,321 | B2 * | 9/2005 | Stancu et al. | 363/40 |
| 7,271,562 | B2 * | 9/2007 | Lee et al. | 318/609 |
| 2004/0007997 | A1 | 1/2004 | Fu | |
| 2004/0036434 | A1 | 2/2004 | Chen et al. | |
| 2004/0232862 | A1 * | 11/2004 | Wogari et al. | 318/254 |
| 2005/0007044 | A1 * | 1/2005 | Qiu et al. | 318/254 |
| 2005/0029972 | A1 * | 2/2005 | Imai et al. | 318/254 |
| 2005/0035678 | A1 * | 2/2005 | Ward et al. | 310/156.37 |
| 2005/0207192 | A1 * | 9/2005 | Fu et al. | 363/89 |
| 2006/0006829 | A1 * | 1/2006 | Anghel | 318/719 |
| 2006/0284582 | A1 * | 12/2006 | Jeong et al. | 318/432 |
| 2007/0069681 | A1 * | 3/2007 | Imura et al. | 318/717 |
| 2007/0069682 | A1 * | 3/2007 | Ide et al. | 318/719 |
| 2007/0107973 | A1 * | 5/2007 | Jiang et al. | 180/443 |
| 2007/0216218 | A1 * | 9/2007 | Matsushita et al. | 303/20 |
| 2009/0026998 | A1 * | 1/2009 | Ueno et al. | 318/703 |
| 2009/0218965 | A1 * | 9/2009 | Williams et al. | 318/265 |
| 2009/0234538 | A1 * | 9/2009 | Ta et al. | 701/41 |
| 2009/0295316 | A1 * | 12/2009 | Patel et al. | 318/400.02 |

FOREIGN PATENT DOCUMENTS
WO    2006025905 A1    3/2006
* cited by examiner

*Primary Examiner* — Walter Benson
*Assistant Examiner* — Eduardo Colon-Santana
(74) *Attorney, Agent, or Firm* — Perman & Green, LLP (57) ABSTRACT

A device for controlling an electromechanical actuator includes an electric motor and an actuator operated by the electric motor. It also includes a digital signal processor (DSP) providing data of reference voltages ($Ud_{ffw}$, $Uq_{ffw}$) on the basis of a decoupled electrical model of the motor. The processor has at least one Park transformation module receiving measurement data for the currents of at least two supply phases of the motor (i_mot_2, i_mot_3) and a datum for the estimated angle of the motor ($\theta_{estimated}$) and transforming them into data regarding the component of current with stator current axis (id) and the component of current in quadrature with the stator current (iq).

18 Claims, 7 Drawing Sheets

DEVICE FOR CONTROLLING AN ELECTROMECHANICAL ACTUATOR

BACKGROUND

1. Field

The disclosed embodiments relate to a device for controlling an electromechanical actuator such as a brake piston electromechanical actuator for an aircraft wheel in a system such as an electrically controlled braking system.

2. Brief Description of Related Developments

Electromechanical devices such as aircraft brake systems controlled by electromechanical actuators require that an instruction be transmitted from an operator, here the pilot depressing the brake pedals, to a mechanical system, here the brakes, and that operating parameters of the system be controlled at various levels of the control chain of the system so as to comply with the parameters of the instruction.

In the case of a braking system, the parameters of the instruction are the force on the pedal and its depth of depression which must correspond at the brake level to a greater or lesser loading as a function of the desired braking.

In such an electrically operated braking system, it is known to use for the actuator an electric motor controlling the position and the loading applied to one or more braking pistons acting on a series of brake disks.

At the brake regulation level, speed sensors for example of tachometric generator type make it possible to inform the computer controlling the braking of the speed of each wheel so as to command the optimum braking. When this speed is less than a calculated reference speed, the computer opens a servocontrol limiting the torque at the wheels so as to prevent them locking and to achieve an anti-lock system.

In the case of electrically controlled brakes, electromechanical actuators replace the traditional hydraulic pistons.

The elimination of any hydraulic energy will be fully ensured by virtue of the electrical energy provided by the aircraft and retransmitted to the brakes by electrical boxes which control the pressure loading on the brake disks through electromechanical actuators which themselves replace the traditional hydraulic pistons. Thus, when the pilot brakes, the computer sends the information to a control box, which transforms the electrical information into an electromechanical load. The electromechanical actuators, four in number per wheel, placed on the brake ring, then squeeze the disks together as in traditional hydraulic braking.

A braking system with electromechanical actuators is for example described in document WO 2006/025905 A1.

It is moreover known to couple a device for measuring motor position and speed to the electric motor of such a system so as to allow feedback or slaving of the control system.

The sought-after aim when designing an actuator control is to obtain smooth rotation regardless of speed, as well as fast accelerations and decelerations while having total control of the torque of the motor at zero speed. For this purpose, it is necessary to have information regarding the position and speed of the rotor of the motor.

Various devices for measuring speed and position of a motor are known, coding wheels, resolvers or the like.

It is becoming ever more important to know the parameters such as speed, position, pressure and temperature, but the use of mechanical sensors is less and less desirable. Specifically, the economic factor which requires inexpensive and unimpaired maintenance of the quality of the motor control, demands a reduction in the number of electrical sensors and the frequent elimination of mechanical sensors. Moreover, one of the important problems in the design or use of a sensor of the resolver type and the like is the sensitivity of the sensor with respect:

to the value of linearity and of its frequency of variation that is to say the passband of the sensor, to time, on account of the aging of the sensor, to the action of physical quantities of its environment, which are not the subject of measurement and that are called "the disturbances" such as magnetic fields, temperature, humidity, vibrations, shocks, possible variations in the supply voltage.

The electric motors used in systems comprising an actuator operated by a motor are generally brushless motors or direct current motors with no commutator. They consist of a stator made of a stack of laminations in which is disposed a winding generally three-phase star-connected and of a rotor formed on an assembly of laminations and magnets creating the inductor flux.

To avoid the use of sensors, it is necessary to develop efficacious techniques making it possible to implement indirect detection of the speed and/or position of the rotor of the motor of the electromechanical actuator but also ensuring system performance which is very sensitive to variations in its operating parameters and to the accuracy of the measurements.

The high-performance digital controls of synchronous motors with permanent magnets are based on the use of the Park transformation. This state transformation offers a new benchmark in which the electromagnetic torque is a direct image of the quadrature component (q) of the stator current.

However, these controls remain contingent on a measurement of the position and speed of the motor by a dedicated sensor.

As sensors, resolvers are much used in industry to operate such motors but are too expensive.

It is thus very beneficial to estimate the position of the rotor of the motor in an indirect manner.

SUMMARY

It would be advantageous to achieve such an estimation, to thus simplify the slaving of electromechanically controlled systems and to reduce the number of sensors.

The aspects of the disclosed embodiments can eliminate the position speed sensor of a servomotor of an actuator in a device for controlling a system of electromechanical actuators, such as an electrically controlled braking system, by formulating control techniques, using particular algorithms, so as to indirectly obtain the information regarding the speed of rotation and the position of the servomotor of DC current motor type on the basis of a measurement of the currents of at least some phases of the motor and on the basis of processing this information at the electrical braking system level so as to perform the slaving thereof.

To do this the disclosed embodiments relate more particularly to a device for controlling an electromechanical actuator comprising an electric motor and an actuator operated by the electric motor, comprising a digital signal processor providing data of reference voltages on the basis of an decoupled electrical model of the motor, the processor comprising at least one Park transformation module receiving measurement data for the currents of at least two supply phases of the motor and a datum for the estimated angle of the motor and transforming them into data regarding the component of current with stator current axis and the component of current in quadrature with the stator current, a module for comparing these data with reference values of current with stator current axis and of current in quadrature with the stator current providing, through integral proportional correctors, data for the voltage variation, the voltage variation data being combined with the reference voltage data at the input of a vector regulation module operating an inverter for supplying the motor with pulses of modulated width.

BRIEF DESCRIPTION OF THE DRAWINGS

Other characteristics and advantages of the disclosed embodiments will become apparent on reading the description which follows of an exemplary nonlimiting embodiment of the disclosed embodiments with reference to the drawings which represent.

DETAILED DESCRIPTION OF THE EMBODIMENTS

The disclosed embodiments rest principally on the decomposing of a stator current into direct Id and quadrature Iq components and on the digital processing of these measurements of currents by a computer of signal processor type (DSP) so as to operate an electromagnetic actuator.

This decomposition is aimed at producing decoupled control in terms of flux and torque.

The disclosed embodiments aim to eliminate the mechanical sensors for measuring position and speed of the motor of the actuator and makes provision, in order to obtain this decoupled control in terms of flux and torque through a determination of the stator currents Id, Iq, for a measurement of the line currents I1, I2 of at least two phases of the motor and a Park transformation using the rotor's estimated position applied to the measured values so as to obtain the values of feedback direct stator current and quadrature current Id_fb, Iq_fb.

This estimated position (making it possible to ensure auto operation of the actuator) can be determined on the basis of mechanical sensors, but, within the framework of the disclosed embodiments it is estimated through an innovative procedure making it possible to dispense with sensors.

The quadrature current component controls the torque of the motor and a reference value Iqref is therefore proportional to the torque required.

The control amounts to slaving the two continuous quantities, namely the currents Idref, Iqref with the aid of IP correctors in a nested structure whose output is del_Ud, del_Uq, variations in the voltages Ud, Uq thus making it possible to maintain the currents in the vicinity of their reference values.

These two outputs are then compared with two quantities Ud$_{\_ffw}$, Uq$_{\_ffw}$ direct voltages, coming from an decoupled electrical model of the motor based on parametric constants Rs, Ld, Lq, ψ and ωe, where Rs is the resistance of the stator, Ld the value of direct self inductance, Lq the value of quadrature self inductance, ψ being the magnetic flux of the machine expressed in Webers (Wb) ωe being the electrical speed at the level of the rotor, expressed in rpm.

To prescribe the control voltages Ud, Uq, it is appropriate to prescribe the voltage vector Us at the input of the inverter operating the motor.

The voltages Ud, Uq are given by equations comprising the sum of the voltages arising from the motor's decoupled electrical model:

$$\begin{cases} ud = \text{ud\_ffw} + \text{del\_ud} \\ uq = \text{uq\_ffw} + \text{del\_uq} \end{cases}$$

The voltage Us is defined by the equation:

$$U_s = \sqrt{U_d^2 + U_q^2}$$

With this proposed control solution, an effective drive system is thus obtained, capable of prescribing the nominal torque of the motor from stationary to nominal speed by altering the axis q or even at very high speed by altering the axis d.

Figure 1:
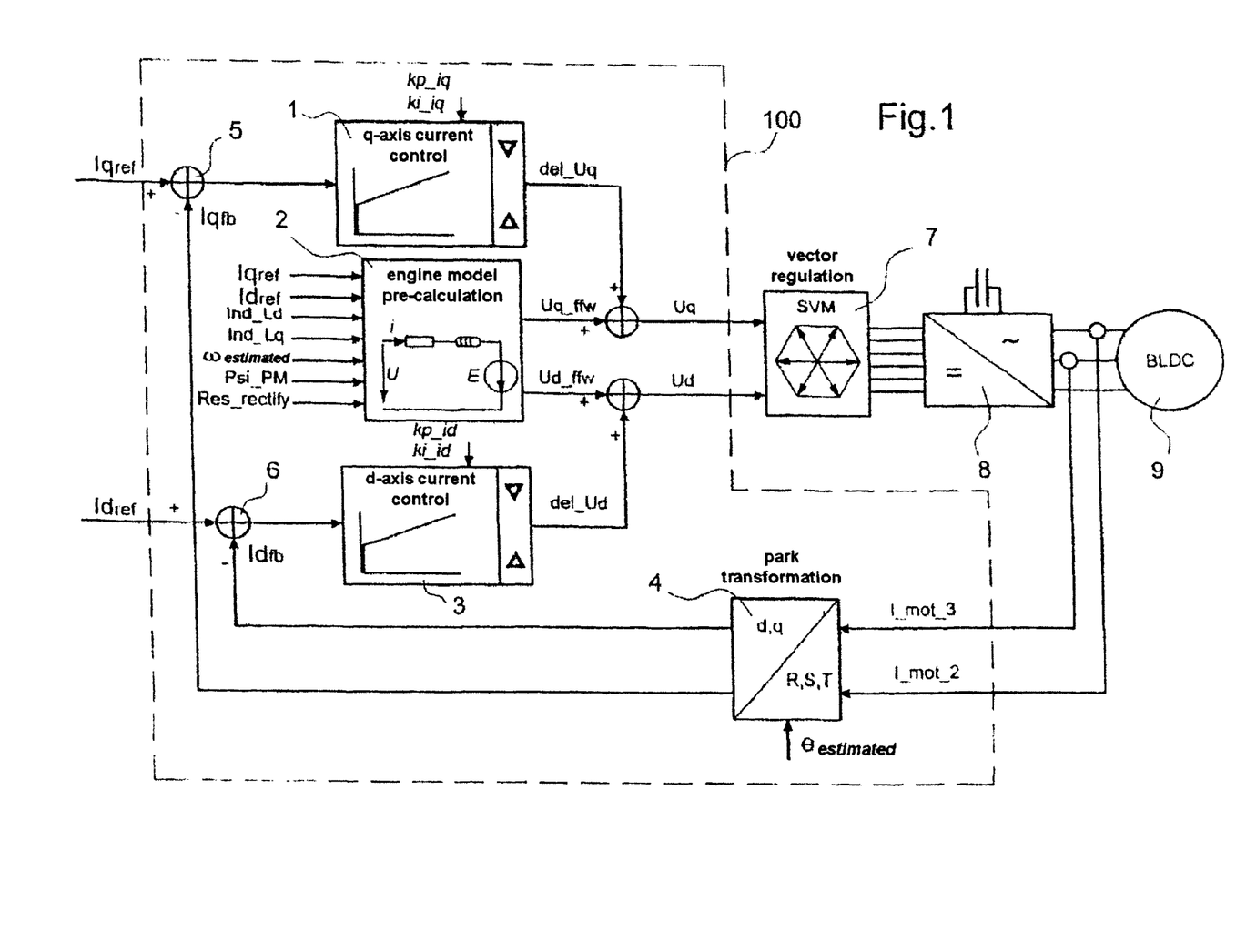
in FIG. 1: a schematic view of a base calculation module of the device of the disclosed embodiments.

Thus, as represented in FIG. 1, the digital signal processor DSP, which encompasses modules for calculating control of current with axis q 1, for precalculating the model of the motor 2, for controlling the current with axis d 3, provides reference voltage data Ud_ffw, Uq_ffw on the basis of the decoupled electrical model of the motor, comprises a Park transformation module 4 receiving measurement data for the currents of at least two supply phases of the motor i_mot_2, i_mot_3 and a datum for the estimated angle of the motor θ$_{estimated}$ and transforming them into data regarding the component of current with stator current axis id and the component of current in quadrature with the stator current iq, a module 5, 6 for comparing these data with reference values of current with stator current axis id$_{\_ref}$ and of current in quadrature with the stator current iq$_{\_ref}$ providing, through integral proportional correctors (IP) 1, 3, data for the voltage variation del_Ud, del_Uq, the voltage variation data being combined with the reference voltage data Ud$_{\_ffw}$, Uq$_{\_ffw}$ at the input of a vector regulation module 7 operating an inverter 8 for supplying the motor 9 with pulses of modulated width.

Figure 2:
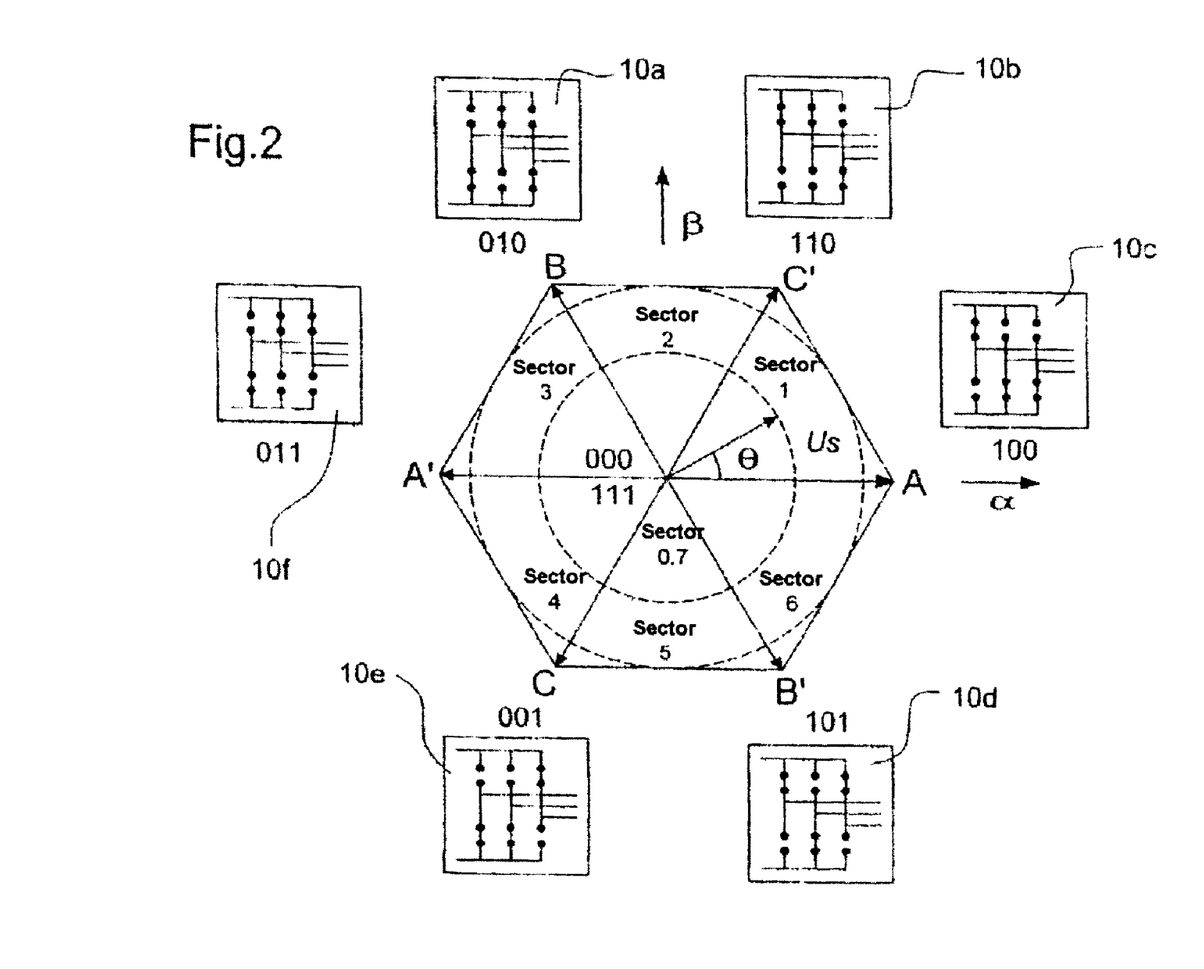
in FIG. 2: a schematic view of a vector spatial modulation of control currents of a motor of a device according to the disclosed embodiments.

The inverter 8 is a three-arm inverter, the vector regulation module 7 operating this inverter through six principal vectors phase shifted with respect to one another by 60° and thus forming six sectors represented in FIG. 2.

Each of the vectors corresponds to a sequence composed of three logic variables which instantaneously operate the three arms of the inverter according to a sequence 10a, 10b, 10c, 10d, 10e, 10f of opening closing of the supply circuits of the motor according to the sectors.

In the control of actuator motors it is often necessary to operate the actuator at high speed and, in this case, it is desirable to be able to exceed the nominal speed of the motor, this making it necessary to reduce the "defluxing" magnetic flux.

Three theoretical solutions make it possible to ensure "defluxing":

increasing the inductance Ld:

a solution which is difficult to envision insofar as it corresponds to modifications of the geometry of the actuator and is certainly expensive from the construction point of view, decreasing the amplitude of the phaser Us:

usable only for actuators of the "wound excitation" type. One will speak of defluxing by the rotor.

Increasing the current Id:

this procedure amounts to increasing the flux in absolute value. One will then speak of defluxing at the stator. This procedure which is achievable for machines with magnet requires, however, complicated control since it may involve several successive phases.

Figure 3:
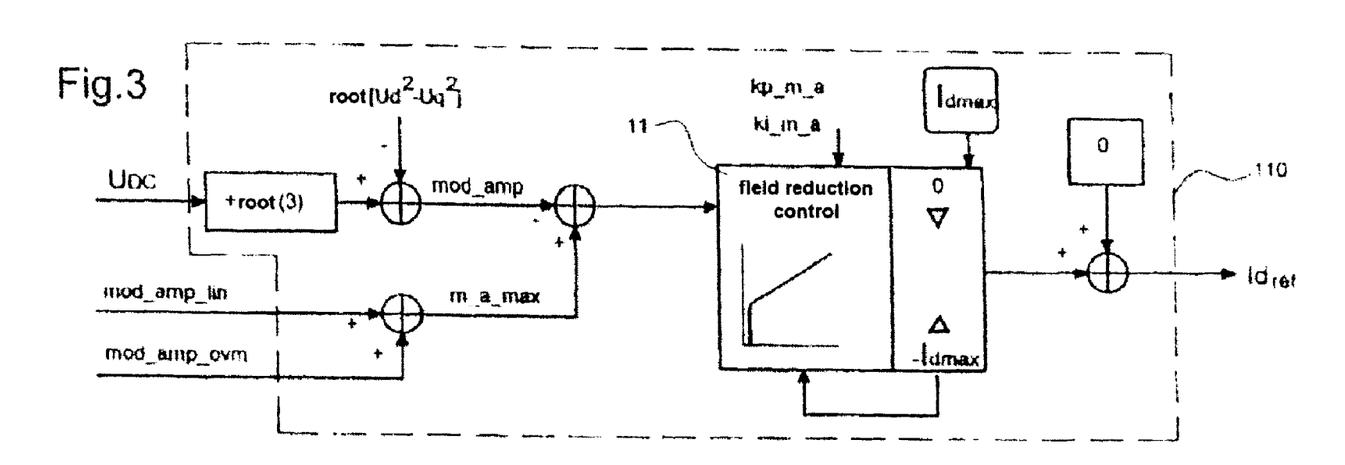
in FIG. 3: a schematic view of a flux reduction module according to an embodiment of the disclosed embodiments.

The solution developed within the framework of the disclosed embodiments represented in FIG. 3 may be applied either to machines with magnets or to those with wound excitation making it possible either to operate in the defluxing regime Id≠0 or intended to operate at constant speed Id=0.

The dynamic performance of the control system at the level of the motor rotation speed is restricted in the so-called "high speed" zone on account of the limitation of the output voltage of the inverter. Consequently, it is necessary for the voltage of the motor to be reduced when the motor operates in the "high speed" zone.

To alter the dynamics of the flux, we have to control the input Id_ref perfectly.

To deliver more torque beyond the nominal speed, that is to say in overspeed, we install a field reduction module making it possible to lower the flux through the instruction of the stator current Idref.

FIG. 3 shows in detail the closed-loop control of the field reduction module.

According to this figure, the reference current value $id_{ref}$ with stator current axis is generated, through a regulator module of integral proportional type 11 part of the DSP, on the basis of modulation data of the inverter $mod\_amp$, $m\_a\_max$.

The value of the current Idref required is generated on the basis of two very specific quantities related to the operation of the inverter mod_amp and m_a_max through the IP type regulator 11.

Below the nominal speed, the defluxing is not necessary, since Us is smaller than the limit voltage Usmax. Consequently in this case, the value of the current Idref remains equal to zero (equivalent to a control in the q axis alone).

In the overspeed range, the IP regulator generates the value of the current Idref to obtain Us=Usmax.

The aim of the factor m-a-max is to choose the type of desired modulation of the spatial vector, through the calibratable parameter mod_amp_ovm, that is to say, linear modulation or under nonlinear over-modulation.

Using this latter procedure, the output voltage of the vector regulation module may be extended to higher voltages than $US_{max}$. The limit of Us may be increased up to $Us_{max\_over}$.

This gives a partial limitation on the three-phase voltages (trapezoidal waveform) making it possible to limit the number of switchings at the inverter level. In the over-modulation range, the relation between output voltage and amplitude modulation is as follows:

$$U_s = (mod\_amp\_lin + mod\_amp\_ovm) * U_{s\,max\_over}$$

The value mod_amp arises from a measurement of DC voltage UDC divided by a coefficient root of 3 compared with the modulus of the voltages Ud, Uq and the value m_a_max arises from summing the data mod_amp_lin and mod_amp_ovm.

The parameter that can be calibrated for the range is given by mod_amp_ovm=[0.1].

If mod_amp_ovm=0 the system is in a state where the over-modulation is deactivated, if mod_amp_ovm=1 the system is in a state for which the over-modulation is activated.

In the actual implementation of the modulation of the spatial vector, the over-modulation procedure may or may not be implemented. In the latter case, the parameter mod_amp_ovm is equal to 0.

The regulator 11 is thus adapted for delivering a value of current with reference stator current axis id_ref constituting a control for reducing the flux of the motor for a motor supply voltage US greater than or equal to the nominal voltage of the motor Usmax and a zero value for a supply voltage below the nominal voltage.

Figure 4:
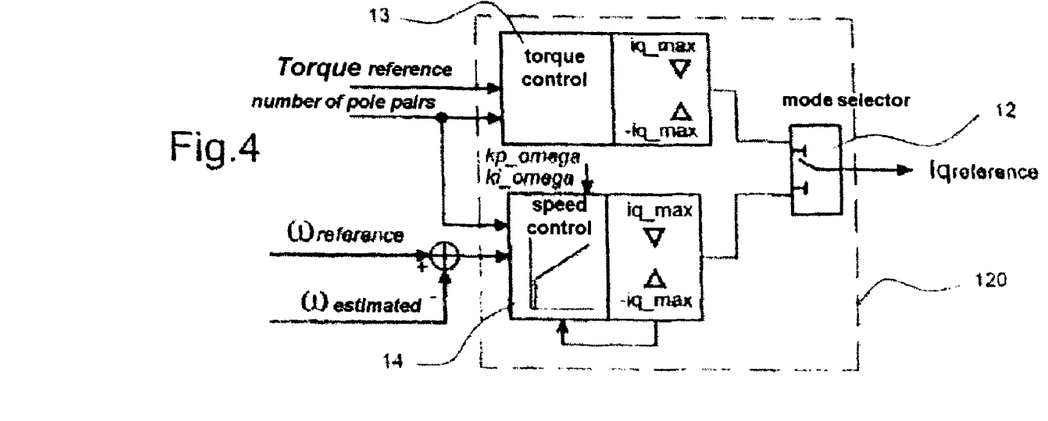
in FIG. 4: a schematic view of a speed or torque control module according to another embodiment of the disclosed embodiments.

For the control of the motor the DSP comprises a module for controlling the electric motor comprising a torque control block and a speed control block, which are represented in FIG. 4, alternatively selectable and delivering a reference quadrature current value $Iq_{reference}$.

The command of the electromagnetically controlled actuator can be controlled either in terms of speed (or position) on the basis of the information coming from a module for reconstructing position and speed of the motor, which will be described later, or in terms of torque through a mode selection 12.

The torque control block comprises an integral-proportional type corrector 13 receiving data regarding the reference torque and number of poles of the motor and delivering, when it is selected, the reference quadrature current value.

The speed control block comprises an integral-proportional type corrector 14 receiving a datum regarding the comparison of a reference angular speed ωref and an estimated angular speed ωestimated and delivering, when it is selected, the reference quadrature current value.

When working in speed regulation mode, it is the output of the speed control corrector 14 which prescribes the instruction for the current $Iq_{reference}$, when working in torque mode it is the output of the torque control corrector module 13 which prescribes this current instruction.

At the structural level, the two correctors 13, 14 are of the IP (integral proportional) type. Such a structure has the advantage with respect to PI type correctors of not involving any zero in the closed-loop transfer function. The absence of the zero makes it possible to obtain a smoother control by not causing any discontinuity in $Iq_{reference}$, the reference of the current Iq. Moreover, we add a limitation on the reference of the current $Iq_{reference}$ which thus ensures protection of the machine.

Likewise at least one of the blocks comprises a device for limiting the current value between two extreme values iq_max, −iq_max.

To avoid continuing to integrate the transient regime speed error in the reference $Iq_{reference}$, we have also implemented a structure for limiting feedback in the speed loop by introducing an additional control loop that takes account of the a posteriori saturation (anti-windup).

Such a loop avoids or minimizes the effect of the a posteriori saturation phenomenon in the integral actions at the level of the IP corrector and preserves the stability and performance of the looped system.

The "anti-windup" will be active only when the saturation thresholds are attained, that is to say, when the output Iqreference of the speed command and torque control block equals *Iqmax."

This structure satisfies the following equations:

$$\begin{cases} \omega_{estimated} - \omega_{reference} >= 0 \text{ or Integrator term} >= i_{qmax} \\ \text{or} \\ \omega_{estimated} - \omega_{reference} < 0 \text{ or Integrator term} >= i_{qmax} \end{cases}$$

Figure 5:
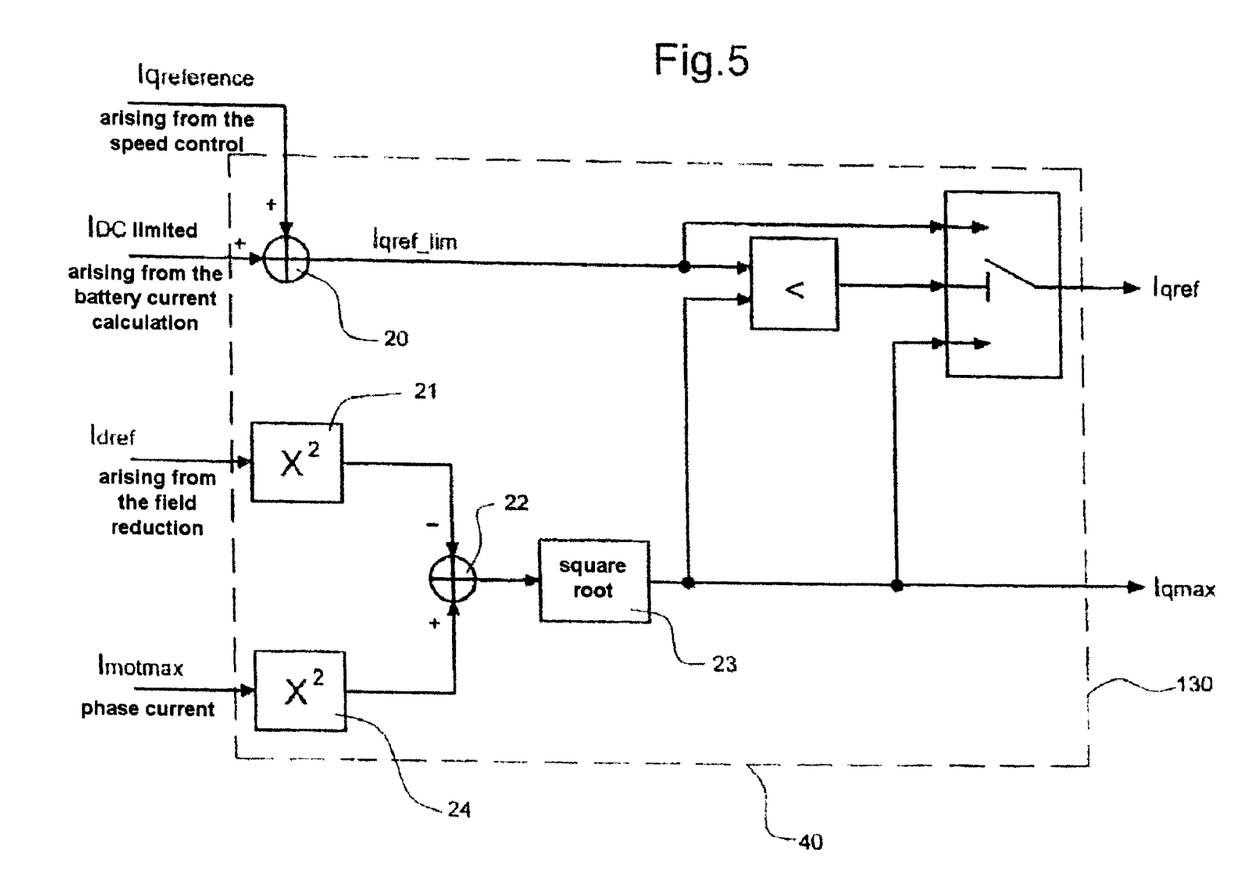
in FIG. 5: a schematic view of a module for calculating the reference current with the axis q for a device according to the disclosed embodiments.

Furthermore, a module for determining the maximum q-axis current as represented in FIG. 5 is provided.

The current limited in the q axis $I_{qref\_lim}$ arises from a summation 20 and the expression for the current limited in the q axis is:

$$I_{qref\_lim} = I_{ref} + I_{DC\ limited}$$

The current Iqmax is obtained by calculation modules 21 to 24 corresponding to the equation:

$$I_{qmax} = \sqrt{(I_{dref}^2 + I_{motmax}^2)}$$

where, $I_{motmax}$ is the maximum limited phase current.

The new Iqmax calculated serves as limitation for Iqref. As Iqref is directly proportional to the torque of the motor, the modification of Iqmax also changes the torque available on the motor.

Figure 7:
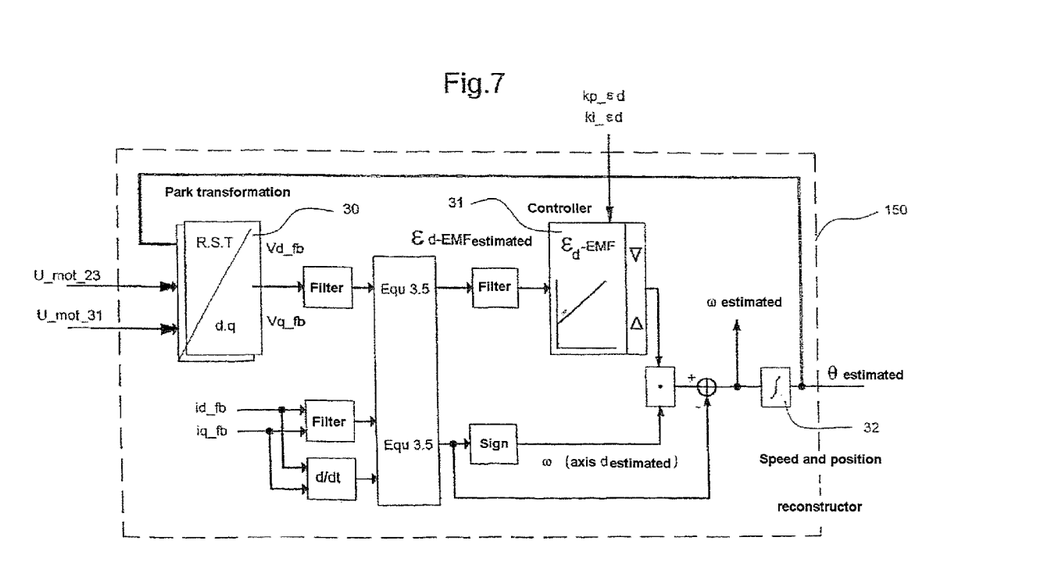
in FIG. 7: a schematic view of a module for reconstructing speed and position for a device according to the disclosed embodiments.

The estimated angular speed $\omega_{estimated}$ is obtained through a module for reconstructing the speed and position of the motor represent in FIG. 7.

Let us consider a differential system involving a quantity γ, speed of rotation that one wishes to estimate, this then involves having a system of z different equations converging to one and the same result if, and only if, y takes its true value.

Thus by utilizing the error between the equations and installing a corrective action, it is possible to make the two systems converge and thus yield a good estimate of γ.

According to the expression for the error of the electromagnetic force EMF in the d axis estimated, єd-EMFestimated which can be written in the following form on the basis of the quantities (measured voltage and current) via Park's transform module labeled 30 in FIG. 7:

$$\epsilon d_{-EMF\ estimated} = (Vd_{-fb} - Rs.Id_{-fb} - p.Ls.Id_{-fb}) - (-\omega_{estimated}.Ls.Iq_{-fb})$$

and the expression for the estimate of the speed expressed this time in the q axis:

$$\omega_{(q-axis)estimated} = \frac{Vq_{-fb} - (Rs + p \cdot Ls) \cdot Iq_{-fb}}{Ke + Ls \cdot Id_{-fb}}$$

where Rs is the resistance of the stator and Ls its inductance.

The estimate of the speed (ωestimated) is then corrected as a function of (ΔωC):

$$\omega_{estimated} = \omega_{(q-axis)estimated} + \Delta\omega_c$$

with, $$\Delta\omega_c = \text{sign} \cdot (\omega_{(q-axis)estimated}) * \left(Kp_{\epsilon d} + \frac{Ki_{\epsilon d}}{p}\right) * \epsilon d_{-EMF estimated}$$

which will yield a zero position error, i.e. a correct position estimate:

$$\theta_{estimated} = \theta_{actual} + \Delta\theta$$

If in the (d, q) representation, the current Id_fb is kept constant through the control, and if Iq_fb is constant as a function of the desired amplitude of the current or the speed and if ΔωC and Δθ are small (low error), we can prove that:

$$\epsilon d_{-EMF\ estimated} = -\omega_{estimated}.ke.\Delta\theta$$

At the level of determining the coefficients of the PI corrector 31 making it possible to cancel out and to link the position error Δθ to the voltage error єd-EMFestimated, the operating range is determined according to several sets of gain Kpєd, Kiєd and several assumptions and conditions, namely:

$$\begin{cases} Ki_{\epsilon d} > \text{if } \frac{1-\sqrt{2}}{Ke} & si \Delta\theta = 0 \\ Ki_{\epsilon d} - Kif_{\epsilon d} > \frac{1-\sqrt{2}}{Ke} & si \Delta\theta = \pi/4 \\ Ki_{\epsilon d} - Kif_{\epsilon d} > \frac{1-\sqrt{2}}{Ke} \pi/4 & \theta = \pi/4 \end{cases}$$

±Π/4 being the angular limit of the operating zone, corresponding to the maximum error made in the initial position of the rotor, not requiring the intervention of a pre-clamping step.

The module for reconstructing the speed and position of the motor of FIG. 7 which carries out the functions described above operates on the basis of at least two data regarding measurements of voltages between supply phases of the motor $U_{mot23}$, $U_{mot31}$ and of the data regarding the measurement of the currents of at least two supply phases of the motor $i_{mot\_2}$, $i_{mot\_3}$.

The reconstruction module comprises the Park transformation block 30 providing data regarding the voltage with stator axis $Vd_{-fb}$ and quadrature voltage $Vq_{-fb}$ on the basis of the voltage measurement data $U_{mot23}$, $U_{mot31}$ and of the feedback data regarding the estimated angle of the motor $\theta_{estimated}$.

The calculation unit, included in the module, carries out by iterative calculations, on the basis of the stator axis and quadrature voltage data as well as of the stator axis and quadrature current data, the calculation of the estimated angular speed of rotation $\omega_{estimated}$ of the motor and by integration 32 the calculation of the estimated angle $\theta_{estimated}$ of the motor.

Figure 6:
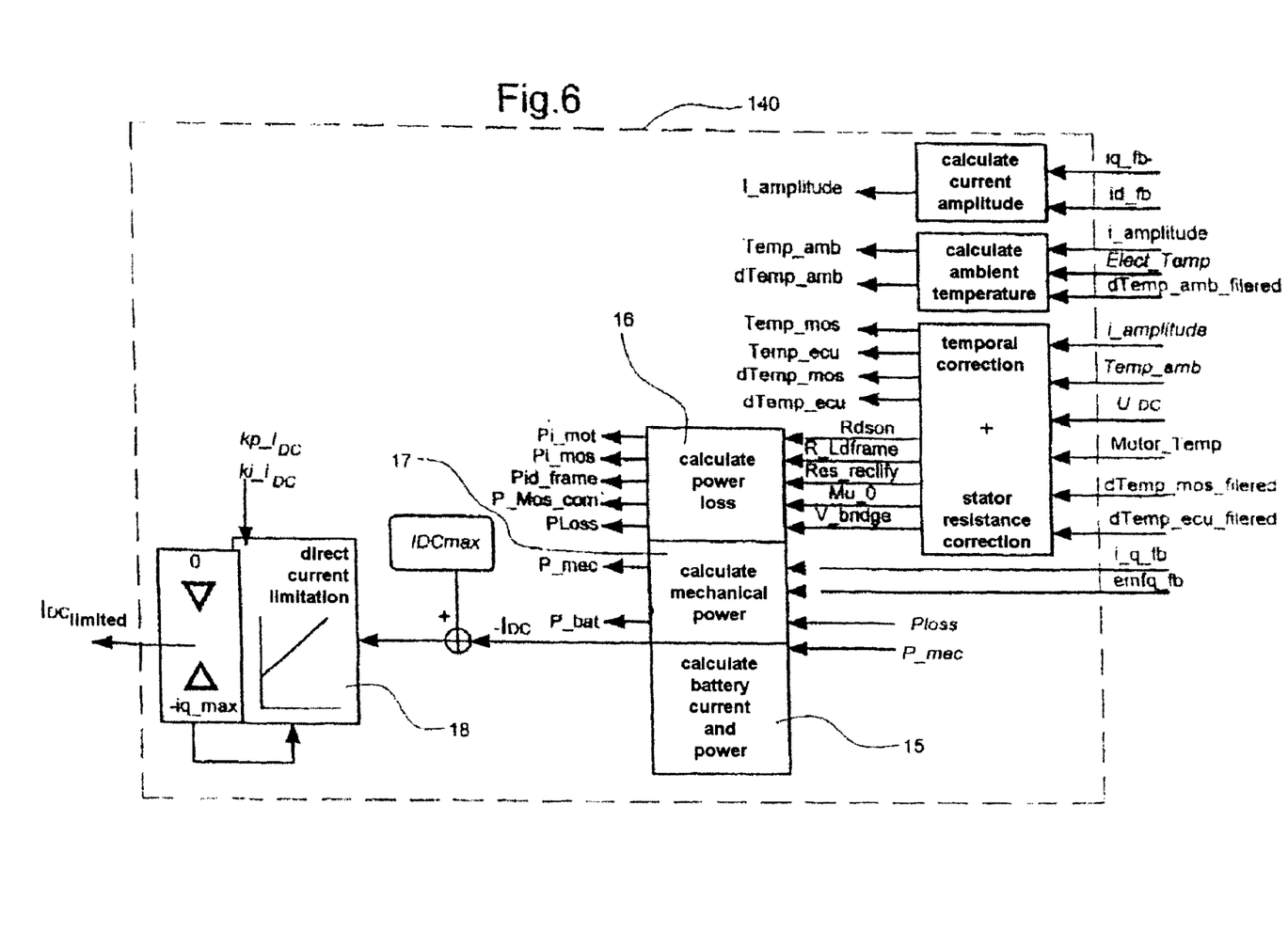
in FIG. 6: a schematic view of a module for calculating direct current for a device according to the disclosed embodiments.

According to a complementary aspect of the disclosed embodiments, FIG. 6 represents a block for calculating the power absorbed and the current $I_{DC}$, on the basis of measurements and data regarding the operation of the inverter 8 and the motor 9.

The efficiency of an electric motor is an important parameter in particular for embedded systems where the energy source is limited.

The efficiency of a motor is optimized during its construction for operation in the nominal regime. It is possible to optimize the efficiency over a given operating range by defining a particular control strategy. To do this, we will measure the power absorbed by the machine. For the sake of simplification, the measurement of the power is done at the level of the DC bus on the basis of a power balance. In this case, the current $I_{DC}$ is obtained by taking the product of the Power P_bat times the voltage $U_{DC}$.

The block for calculating the power absorbed and the current $I_{DC}$ advantageously comprises a module for calculating a direct current $I_{DC}$ absorbed by the inverter, receiving data regarding temperature, supply voltage of the inverter $U_{DC}$ and counterelectromotive force of the motor $E_0$ receiving moreover the data regarding the component of current with stator current axis Id and the component of current in quadrature Iq with the stator current, and comprising means for calculating, on the basis of these data, power losses 16 due to the control components of the motor $P_{loss}$ and mechanical power 17 restored by the motor $P_{MEC}$, this calculation module furthermore comprising means 15 for calculating said current absorbed $I_{DC}$ on the basis of the ratio of the sum of said powers and the supply voltage of the inverter $U_{DC}$.

It furthermore comprises a module 18 for limiting said current absorbed providing a limited value of direct current absorbed by the inverter $I_{DClim}$.

Finally, to determine the current with reference quadrature axis $Iq_{ref}$, the device comprises a summater 20 of the reference quadrature current value $Iq_{reference}$ and of the limited value of direct current absorbed by the inverter $i_{DClim}$ so as to provide a limited quadrature current value iq_ref$_{lim}$.

This limited quadrature current value as well as the direct current value Id_ref and the maximum motor current value $I_{mot\ max}$ are used in the module 130, for calculating the q-axis reference current $Iq_{\_ref}$ represented in FIG. 5 and discussed above.

Figure 8:
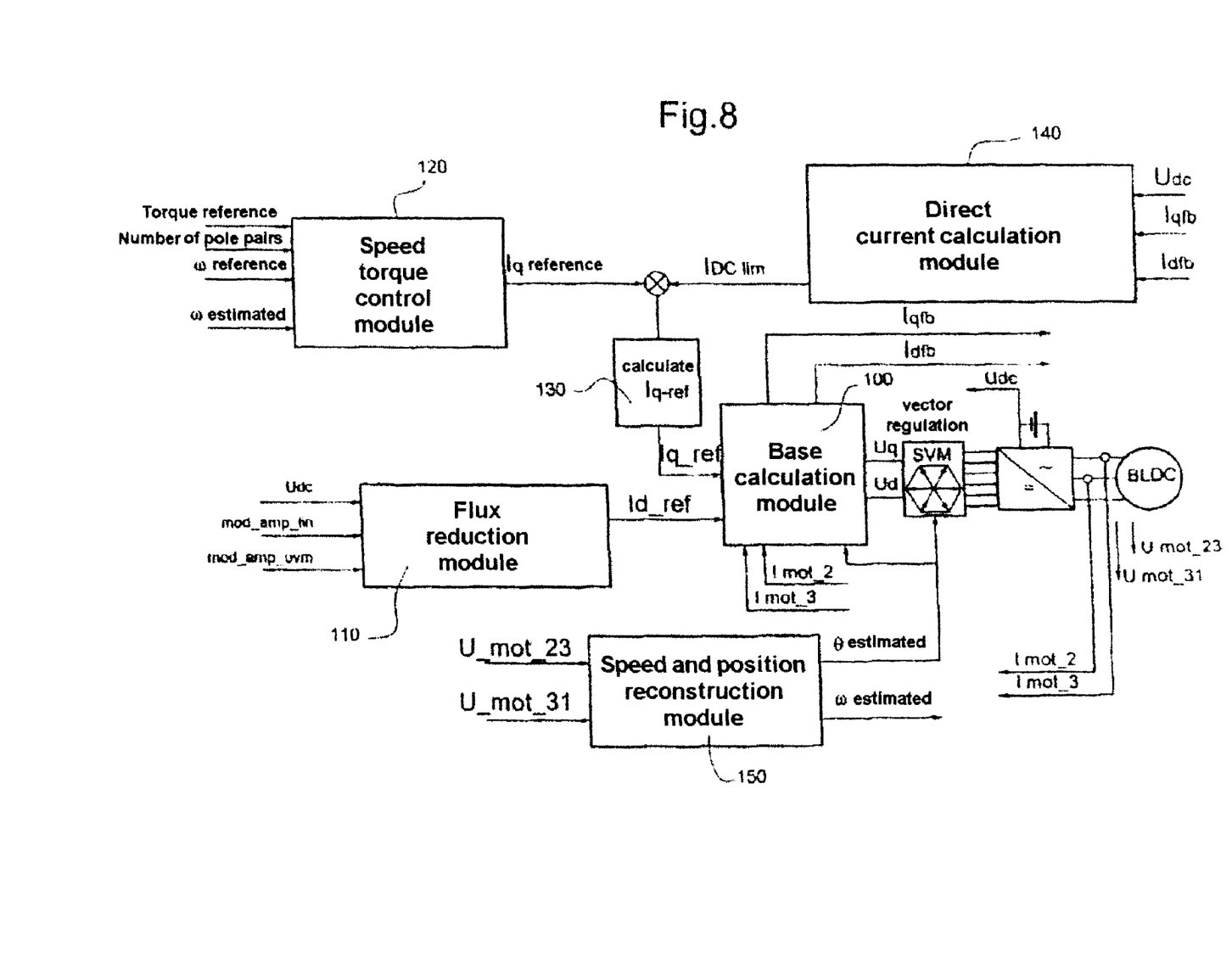
in FIG. 8: an overall schematic view incorporating the modules of FIGS. 1 to 7 for an electromagnetic actuator control device according to the disclosed embodiments.

A simplified view bringing together all the modules discussed above, module 100 base calculation module, module 110 flux reduction module, module 120 for speed or torque control, module 130, module for calculating the reference current with axis q, module 140 module for calculating direct current and module 150 module for reconstructing speed and position is given in FIG. 8.

Thus the device of the disclosed embodiments makes it possible, on the basis of current measurements carried out at the level of the electric motor of brushless multipole three-phase motor type, to operate the motor by knowing its speed and angular position without using any speed or position sensor.

It is applied to a system of electromechanical actuators, such as an electrically controlled braking system, for which the motor operated by the device of the disclosed embodiments is used to displace a braking piston on an aircraft equipped with an electromechanical braking system.

The invention claimed is:

1. Device for controlling an electromechanical actuator comprising an electric motor and an actuator operated by the electric motor, characterized in that it comprises a digital signal processor (DSP) providing data of reference voltages (Ud$_{\_fw}$, Uq$_{\_fw}$) on the basis of an decoupled electrical model of the motor, the processor comprising at least one Park transformation module receiving measurement data for the currents of at least two supply phases of the motor (i_mot_2, i_mot_3) and a datum for the estimated angle of the motor ($\theta_{estimated}$) and transforming them into data regarding the component of current with stator current axis (id) and the component of current in quadrature with the stator current (iq), a module for comparing these data with reference values of current with stator current axis (id$_{\_ref}$) and of current in quadrature with the stator current (iq$_{\_ref}$) providing, through integral proportional correctors (IP), data for the voltage variation (del_Ud, del_Uq), the voltage variation data being combined with the reference voltage data (Ud$_{\_fw}$, Uq$_{\_fw}$) at the input of a vector regulation module operating an inverter for supplying the motor with pulses of modulated width.

2. Device according to claim 1 wherein the inverter is a three-arm inverter, the vector regulation module operating this inverter through six principal vectors phase shifted with respect to one another by 60° and thus forming six sectors.

3. Device according to claim 2 for which each of the vectors corresponds to a sequence composed of three logic variables which instantaneously operate the three arms of the inverter.

4. Device according to claim 1, for which the reference current value (id$_{\_ref}$) with stator current axis is generated, through a regulator module of integral proportional type part of the DSP, on the basis of modulation data of the inverter (mod$_{\_amp}$, m$_{\_a\_max}$).

5. Device according to claim 1, wherein the DSP comprises a module for controlling the electric motor comprising a torque control block and a speed control block that are alternatively selectable and deliver a reference quadrature current value (iqreference).

6. Device according to claim 5, further comprising a summater of the reference quadrature current value (Iq$_{reference}$) and of the limited value of direct current absorbed by the inverter (IDC lim) so as to provide a limited quadrature current value (Iq_ref$_{limited}$).

7. Device according to claim 1, further comprising a module for reconstructing the speed and the position of the motor on the basis of at least two data regarding voltage measurements between supply phases of the motor ($U_{mot23}$, $U_{mot31}$) and data relating to the measurement of the currents of at least two supply phases of the motor ($I_{mot\_2}$, $I_{mot\_3}$), the reconstruction module comprising a Park transformation block providing data regarding voltage with stator axis (Vd$_{fb}$) and quadrature (Vq$_{fb}$) on the basis of the voltage measurement data ($U_{mot23}$, $U_{mot31}$), and a feedback datum regarding the estimated angle of the motor ($\theta_{estimated}$), a calculation unit carrying out by iterative calculations, on the basis of the stator axis and quadrature voltage data as well as of the stator axis and quadrature current data, the calculation of the estimated angular speed of rotation ($\omega_{estimated}$) of the motor and by integration the calculation of the estimated angle ($\theta_{estimated}$) of the motor.

8. Device according to claim 1, for which the electric motor is a brushless multipole three-phase motor.

9. System of electromechanical actuators, such as an electrically controlled braking system, comprising a control device according to claim 1.

10. Aircraft equipped with a braking system according to claim 9.

11. Device for controlling an electromechanical actuator comprising an electric motor and an actuator operated by the electric motor, wherein it comprises a digital signal processor (DSP) providing data of reference voltages (Ud$_{\_fw}$, Uq$_{\_fw}$) on the basis of a decoupled electrical model of the motor, the processor comprising at least one Park transformation module receiving measurement data for the currents of at least two supply phases of the motor (i_mot_2, i_mot_3) and a datum for the estimated angle of the motor ($\theta_{estimated}$) and transforming them into data regarding the component of current with stator current axis (id) and the component of current in quadrature with the stator current (iq), a module for comparing these data with reference values of current with stator current (id$_{\_ref}$) providing, through integral proportional correctors (IP), data for the voltage variation (del_Ud, del_Uq), the voltage variation data being combined with the reference voltage data Ud$_{\_fw}$, Uq$_{\_fw}$) at the input of a vector regulation module operating an inverter for supplying the motor with pulses of modulated width, wherein the reference current value (id_ref) with stator current axis is generated, through a regulator module of integral proportional type part of the DSP, on the basis of modulation data of the inverter (mod$_{\_amp}$, m$_{\_a\_max}$), and wherein the regulator is adapted for delivering a value of current with reference stator current axis ($id\_{ref}$) constituting a control for reducing the flux of the motor for a motor supply voltage US greater than or equal to the nominal voltage of the motor $U_{SMAX}$ and a zero value for a supply voltage below the nominal voltage.

12. Device according to claim 11 wherein the inverter is a three-arm inverter, the vector regulation module operating this inverter through six principal vectors phase shifted with respect to one another by 60° and thus forming six sectors.

13. Device according to claim 12 for which each of the vectors corresponds to a sequence composed of three logic variables which instantaneously operate the three arms of the inverter.

14. Device for controlling an electromechanical actuator comprising an electric motor and an actuator operated by the electric motor, wherein it comprises a digital signal processor (DSP) providing data of reference voltages (ud_ffw, Uq_ffw) on the basis of an decoupled electrical model of the motor, the processor comprising at least one Park transformation module receiving measurement data for the currents of at least two supply phases of the motor (i_mot_2, i_mot_3) and a datum for the estimated angle of the motor ($\theta_{estimated}$) and transforming them into data regarding the component of current with stator current axis (id) and the component of current in quadrature with the stator current (iq), a module for comparing these data with reference values of current stator current axis (id_ref) and of current in quadrature with the stator current (iq_ref) providing, through integral proportional correctors (IP), data for the voltage variation (del_Ud, del_Uq), the voltage variation data being combined with the reference voltage data (Ud_ffw, Uq_ffw) at the input of a vector regulation module operating an inverter for supplying the motor with pulses of modulated width, wherein the DSP comprises a module for controlling the electric motor comprising a torque control block and a speed control block that are alternatively selectable and deliver a reference quadrature current value ($iq_{reference}$) and wherein the torque control block comprises an integral-proportional type corrector 13 receiving data regarding the reference torque and number of poles of the motor and delivering, when it is selected, the reference quadrature current value.

15. Device according to claim 14, for which the speed control block comprises an integral-proportional type corrector 14 receiving a datum regarding the comparison of a reference angular speed (ωref) and an estimated angular speed ($\omega_{estimated}$) and delivering, when it is selected, the reference quadrature current value.

16. Device according to claim 14, for which at least one of the blocks comprises a device for limiting the current value between two extreme values ($iq_{max}$, $-iq_{max}$).

17. Device for controlling an electromechanical actuator comprising an electric motor and an actuator operated by the electric motor, wherein it comprises a digital signal processor (DSP) providing data of reference voltages ($Ud\_{ffw}$, $Uq\_{ffw}$) on the basis of a decoupled electrical model of the motor, the processor comprising at least one Park transformation module receiving measurement data for the currents of at least two supply phases of the motor (i_mot_2, i_mot_3) and a datum for the estimated angle of the motor ($\theta_{estimated}$) and transforming into data regarding the component of current with stator current axis (id) and the component of current in quadrature with the stator current (iq), a module for comparing these data with reference values of current with stator current axis $id\_{ref}$ and of current quadrature with the stator current ($iq\_{ref}$) providing, through integral proportional correctors (IP), data for the voltage variation (del_Ud, del_Uq), the voltage data being combined with the ($Ud\_{ffw}$, $Uq\_{ffw}$) at the input of a vector regulation module operating an inverter for supplying the motor with pulses of modulated width, further comprising a module for calculating a direct current absorbed by the inverter (IDC), receiving data regarding temperature, supply voltage of the inverter ($U_{DC}$) and counter-electromotive force of the motor ($E_0$) receiving moreover the data regarding the component of current with stator current axis (Id) and the component of current in quadrature (Iq) with the stator current, and comprising means for calculating, on the basis of these data, power losses due to the control components of the motor ($P_{loss}$) and mechanical power restored by the motor ($P_{MEC}$), this calculation module furthermore comprising means for calculating said current absorbed ($I_{DC}$) on the basis of the ratio of the sum of said powers and the supply voltage of the inverter ($U_{DC}$).

18. Device according to claim 17, wherein it comprises a module for limiting said current absorbed providing a limited value of direct current absorbed by the inverter ($I_{DC\ lim}$).

* * * * *

UNITED STATES PATENT AND TRADEMARK OFFICE
CERTIFICATE OF CORRECTION

| | |
|---|---|
| PATENT NO. | : 7,911,165 B2 |
| APPLICATION NO. | : 12/017578 |
| DATED | : March 22, 2011 |
| INVENTOR(S) | : Laurent Peyras et al. |

It is certified that error appears in the above-identified patent and that said Letters Patent is hereby corrected as shown below:

Column 12, Claim 17, Lines 15-16, delete "transforming into" and insert -- transforming them into --, therefor.

Column 12, Claim 17, Line 23, delete "voltage data" and insert -- voltage variation data --, therefor.

Column 12, Claim 17, Line 23, after "with the" insert -- reference voltage data --, therefor.

Signed and Sealed this
Tenth Day of May, 2011

David J. Kappos
*Director of the United States Patent and Trademark Office*